No. 702,874. Patented June 17, 1902.
L. D. HOWARD.
CHAIN.
(Application filed Jan. 31, 1900.)
(No Model.)
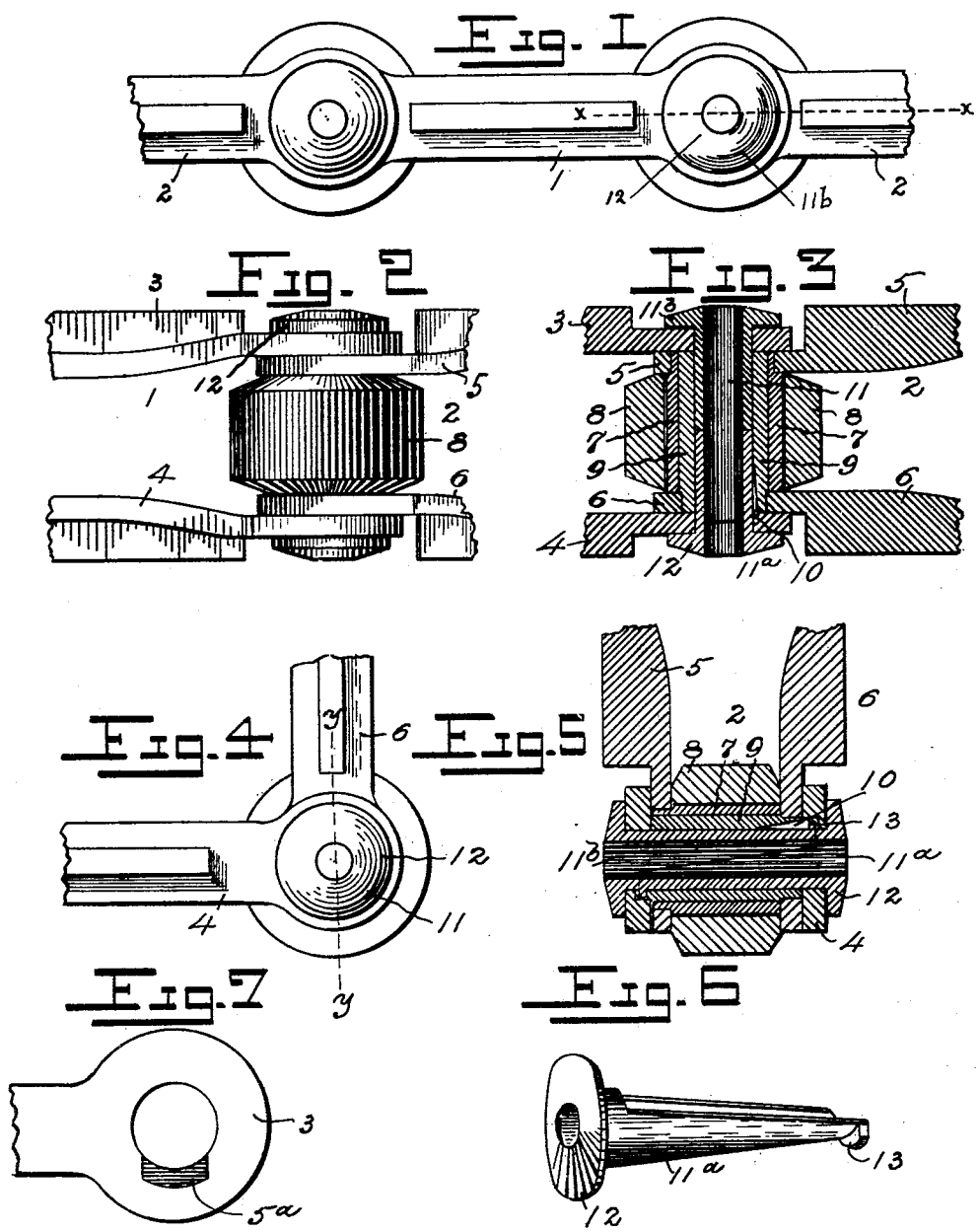

UNITED STATES PATENT OFFICE.

LYMAN D. HOWARD, OF COLUMBUS, OHIO, ASSIGNOR TO J. A. JEFFREY, OF COLUMBUS, OHIO.

CHAIN.

SPECIFICATION forming part of Letters Patent No. 702,874, dated June 17, 1902.

Application filed January 31, 1900. Serial No. 3,537. (No model.)

*To all whom it may concern:*

Be it known that I, LYMAN D. HOWARD, a citizen of the United States, residing at Columbus, in the county of Franklin and State of Ohio, have invented a certain new and useful Improvement in Chains, of which the following is a specification.

My invention relates to the improvement of detachable-link chains, and has particular relation to that class of chains known as "roller" or "double-link" chains, wherein the links consist of parallel bars jointedly connected at their ends.

The objects of my invention are to provide an improved jointed connection for chains of this class, to so construct the same as to obviate the necessity of employing a bolt-and-nut joint-pin, and at the same time facilitate the connection with the chain of various forms of conveying attachments, carriers, &c., and to produce other improvements, the details of construction of which will be more fully pointed out hereinafter. These objects I accomplish in the manner illustrated in the accompanying drawings, in which—

Figure 1 is a side elevation of a portion of a chain containing my improvement. Fig. 2 is a plan view illustrating the connection of adjoining links. Fig. 3 is a sectional view on line $x\ x$ of Fig. 1. Fig. 4 is an end elevation of the connection shown in Fig. 2, showing the relative position of the links when the same are in position for disconnection. Fig. 5 is a sectional view on line $y\ y$ of Fig. 4. Fig. 6 is a detail view in perspective of one of the joint-pin sections, and Fig. 7 is an inner side view of one of the link ends.

Similar numerals refer to similar parts throughout the several views.

1 and 2 represent, respectively, two connected links of my improved chain, the link 1 consisting of parallel link-bars 3 and 4 and the link 2 consisting of parallel link-bars 5 and 6. The ends of these link-bars are provided with central openings, as indicated. The link-bars 3 and 4, which form the alternate links of the chain, have their inner sides at their outer ends, as indicated more clearly in Fig. 7 of the drawings, provided with an offset or recess $5^a$. These recesses communicate with the central openings in the link ends, the recess in the link 3 being at the bottom of said link, while the recess in the opposite link 4 is arranged at the top thereof. One end of each of the link-bars 5 is provided with an inwardly-projecting sleeve 7 at right angles with said bar, said sleeve being rigidly connected with said link-bar or formed integral therewith, as desired. The sleeve 7 is of less diameter than the end of the link-bar 5, and said sleeve is adapted to be loosely surrounded by a roller 8. The link-bar 6 is also provided with an inwardly-extending tubular or sleeve projection, which is indicated at 9, the latter being adapted to fit loosely within the sleeve 7, thus forming a substantially pivotal and telescopic connection between the oppositely-located link-bars 5 and 6. The inner surface of the sleeve or tubular projection 9 is provided on one side with a recess 10. This recess inclined is inwardly from one end of the said sleeve, as indicated in the drawings.

11 represents my improved joint-pin, which is adapted in the manner shown to form a joint or hinge connection between the adjoining ends of the link-bars. This pin consists of a substantially spool-shaped body, which is separated into two sections $11^a$ and $11^b$, this separation being formed by said pin being split longitudinally and diagonally, the line of separation extending from points on the inner side of the enlarged heads or end flanges 12 of said pin. At the points of beginning and ending of the split line thus produced is formed a vertical shoulder, against which the inner ends of the pin-sections are adapted to bear when the pin is completed by the joining of its sections. The inner and smaller end of each of these sections is also provided with a short outwardly-projecting lip portion 13. As indicated in the drawings, the pin-body formed as above described is tubular.

The manner of jointedly connecting two links by my improved pin is substantially as follows: As hereinbefore described, the link-bars 5 and 6 are jointedly connected by the insertion of the tubular projection or sleeve 9 of the bar 6 into the sleeve 7 of the bar 5. The rounded ends of the link-bars 3 and 4 of the next link are then made to embrace opposite ends of the bars 5 and 6. This being accomplished, the pin-section 11ᵃ is inserted into the sleeve 9 from that end thereof in which is formed the internal recess 10. This pin-section is then rotated until its lip 13 has dropped into the offset or depression 5ᵃ, formed, as described, in the link-bar 3. The link 2, consisting of the bars 5 and 6, is now turned to such angle with the link 1 as to bring the recess 10 and the offset 5ᵃ of the link into connection or communication with each other. The remaining pin-section 11ᵇ may now be inserted into the opposite end of the sleeve 9, the lip 13 of said section traveling through the recess 10 and thence into the offset 5ᵃ of said link-bar 4. The bars 5 and 6 being again turned down to an operative position, it is evident that the communication or direct connection of the recess 10 and offset or recess 5ᵃ is broken, and the lips are thus retained within said offsets and the pins thereby prevented from withdrawal. In order to disconnect the links thus united, it is evident that the link 2 must be turned again to such angle as to result in again forming a communication between the recess 5ᵃ of the link-bar 4 and the internal recess 10 of the sleeve 9. This being accomplished, it is evident that the section 11ᵇ may be again withdrawn, after which the section 11ᵃ may be readily removed from connection with the sleeves.

As indicated in the drawings, I preferably so arrange the offset of the internal recess 10 as to necessitate the links being arranged in positions at right angles with each other in order to detach the same. However, the interlocking parts of my device may be so arranged, if desired, as to admit of their disconnection with the links at other angles than right angles.

From the construction and operation which I have described it will be seen that a simple, reliable, and effective chain-link connection is formed which will readily admit of the links of the chain being disconnected and admit of the insertion of other links, as may be desired. It will also be observed that by my construction a hollow-pin connection is formed, so split as not to impair its strength, and that owing to the fact that the sections of said pin are prevented from withdrawal when the chain-links are in their operative position it will be seen that the necessity of a bolt connection for the links is entirely obviated, although it is evident that a bolt may be inserted through said hollow pin, if desired. It will also be seen that by bolting through said pins any of the well-known or desirable forms of attachments—such as conveyer-flights, &c.—may be readily connected with the chain-links.

Having now fully described my invention, what I claim, and desire to secure by Letters Patent, is—

1. In a double-bar-link chain the combination with the links 1 and 2, of a pin adapted to jointedly connect said links, said pin being tubular and split diagonally and means for detachably locking said pin-sections against withdrawal substantially as and for the purpose specified.

2. In a chain the combination with the link-bars 5 and 6, sleeves 7 and 9 projecting respectively from said link-bars and telescoping one within the other, of link-bars 3 and 4 adapted to embrace the ends of said links 5 and 6 and a tubular pin split diagonally as described, said pin-sections being adapted to be inserted into opposite ends of the sleeve 9 and forming a jointed connection of said link-bars substantially as and for the purpose specified.

3. In a chain the combination with the link-bars 5 and 6, telescopically-connected sleeves 7 and 9 projecting from said link-bars there being an inclined internal recess at one end of said sleeve 9, of link-bars 3 and 4 having pin-openings in their corresponding ends and embracing corresponding ends of the bars 5 and 6, there being a recess 5ᵃ formed on the inner side of each of the bar ends 3 and 4 and a tubular pin split diagonally to form sections 11ᵃ 11ᵇ, the inner end of each of said sections being provided with a projecting lip 13 and an enlarged head on each of said sections substantially as and for the purpose specified.

4. In a chain, a link-connecting device made in two parts insertible from opposite sides of the chain, each part having means for engaging that longitudinal member of the chain which lies at the opposite side of said chain to that from which said engaging part is inserted.

5. In a chain, the combination of side bars having tubular telescoping projections extending toward each other, and a connecting-pivot made in two parts inserted from opposite sides of the chain into said tubular projections, each part having means for engaging a member of the chain to hold said part in place.

6. In a chain, a link-connecting pivot made in two tubular parts insertible from opposite sides of the chain and overlapping or extending past each other for a portion of their length, each of said tubular parts having means for engaging the chain member which is at the opposite side of the chain to that from which the tubular part is inserted.

LYMAN D. HOWARD.

In presence of—
C. C. SHEPHERD,
W. L. MORROW.